US011620571B2

(12) United States Patent
Bendre et al.

(10) Patent No.: US 11,620,571 B2
(45) Date of Patent: *Apr. 4, 2023

(54) MACHINE LEARNING WITH DISTRIBUTED TRAINING

(71) Applicant: ServiceNow, Inc., Santa Clara, CA (US)

(72) Inventors: Nikhil Bendre, Carlsbad, CA (US); Fernando Ros, San Marcos, CA (US); Kannan Govindarajan, Sunnyvale, CA (US); Baskar Jayaraman, Fremont, CA (US); Aniruddha Thakur, Saratoga, CA (US); Sriram Palapudi, Santa Clara, CA (US); Firat Karakusoglu, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 16/506,827

(22) Filed: Jul. 9, 2019

(65) Prior Publication Data
US 2020/0005187 A1 Jan. 2, 2020

Related U.S. Application Data

(63) Continuation of application No. 15/849,356, filed on Dec. 20, 2017, now Pat. No. 10,380,504, which is a (Continued)

(51) Int. Cl.
G06N 20/00 (2019.01)
H04L 41/12 (2022.01)
(Continued)

(52) U.S. Cl.
CPC ............... G06N 20/00 (2019.01); G06F 9/46 (2013.01); H04L 41/12 (2013.01); H04L 67/00 (2013.01); H04L 67/60 (2022.05)

(58) Field of Classification Search
CPC .......... G06N 20/00; G06F 9/46; H04L 41/12; H04L 67/00; H04L 67/32
See application file for complete search history.

(56) References Cited

U.S. PATENT DOCUMENTS 6,321,229 B1  11/2001  Goldman
6,609,122 B1   8/2003  Ensor
(Continued)

FOREIGN PATENT DOCUMENTS

WO    2013174451 A1   11/2013
WO    2016004062 A1    1/2016
WO    2017/010922 A1   1/2017

OTHER PUBLICATIONS

European Examination Report for European Patent Application No. 17210977.9 dated Oct. 7, 2020; 6 pgs.
(Continued)

Primary Examiner — Eric Nilsson
(74) Attorney, Agent, or Firm — Fletcher Yoder PC

(57) ABSTRACT

A network system may include a plurality of trainer devices and a computing system disposed within a remote network management platform. The computing system may be configured to: receive, from a client device of a managed network, information indicating (i) training data that is to be used as basis for generating a machine learning (ML) model and (ii) a target variable to be predicted using the ML model; transmit an ML training request for reception by one of the plurality of trainer devices; provide the training data to a particular trainer device executing a particular ML trainer process that is serving the ML training request; receive, from the particular trainer device, the ML model that is generated based on the provided training data and according to the particular ML trainer process; predict the target variable
(Continued)

using the ML model; and transmit, to the client device, information indicating the target variable.

20 Claims, 8 Drawing Sheets

Related U.S. Application Data continuation of application No. 15/717,796, filed on Sep. 27, 2017, now Pat. No. 10,445,661.

(60) Provisional application No. 62/517,719, filed on Jun. 9, 2017, provisional application No. 62/502,550, filed on May 5, 2017.

(51) Int. Cl.
*G06F 9/46* (2006.01)
*H04L 67/00* (2022.01)
*H04L 67/60* (2022.01)

(56) References Cited

U.S. PATENT DOCUMENTS

| | | |
|---|---|---|
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,684 B2 | 1/2007 | Matharu |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari et al. |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,454,732 B1 | 9/2016 | Garton et al. |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 2006/0129502 A1* | 6/2006 | Pastusiak ............ G06F 21/10 705/71 |
| 2011/0277027 A1 | 11/2011 | Hayton et al. |
| 2013/0139152 A1 | 5/2013 | Chang et al. |
| 2015/0193693 A1 | 7/2015 | Vasseur et al. |
| 2015/0193694 A1 | 7/2015 | Vasseur et al. |
| 2015/0379072 A1* | 12/2015 | Dirac ............... G06N 20/00 707/693 |
| 2016/0078361 A1 | 3/2016 | Brueckner et al. |
| 2016/0117601 A1 | 4/2016 | Gaucher et al. |
| 2016/0132787 A1 | 5/2016 | Drevo et al. |

OTHER PUBLICATIONS

Li et al.; "Scaling Distributed Machine Learning with the Parameter Server", Proceeding of the 11th USENEX Symposium on Operating Systems and Design and Implementation, pp. 583-598, Oct. 8, 2014.
Wikipedia: "Distributed Computing—Wikipedia"; XP55377298, May 1, 2016; pp. 1-13; (retrieved from the Internet: URL:https://en.wikipedia.org/w/index.php?7ille=Distributed_computering&oldid=718087723 on May 31, 2017 ).
Zhang, Fan, et al. "Multi-objective scheduling of many tasks in cloud platforms." Future Generation Computer Systems 37 (2014): 309-320.
Ding, Cong, et al. "CloudGPS: a scalable and ISP-friendly server selection scheme in cloud computing environments." Proceedings of the 2012 IEEE 20th International Workshop on Quality of Service. IEEE Press, 2012.
Ribiero, M. et al.; "MLaaS: Machine learning as a service", 2015 IEEE 14th International Conference on Machine Learning and Applications (ICMLA); Dec. 2015; [retrieved from https://ir.lib.uwo.ca/cgi/viewcontent.cgi?article=1123&context=electricalpub].
Yin, W. et al.; "Scalable regression tree learning on Hadoop using OpenPlante", Proceedings of third international workshop on MapReduce and its Applications, Jun. 2012; [retrieved from https://www.osti.gov/servlets/purl/1332538].
Swamy, N.; "Updated AWS CloudFormation Deep Learning Template Adds New Features and Capabilities", Amazon, Mar. 17, 2017; [retrieved from https://aws.amazon.com/blogs/machine-learning/updated-aws-cloudformation-deep-learning-template-adds-new-features-and-capabilities].
Amazon; Deep Learning AMI release v1.2 for Ubuntu and Updated AWS CloudFormation Template Now Available, Mar. 17, 2017; [retrieved from https://aws.amazon.com/about-aws/whats-new/2017/03/deep-learning-ami-release-v1-2-for-ubuntu-and-updated-aws-cloudformation-template-now-available/].
Examination Report for Australian Patent Application No. 2020200637 dated Sep. 3, 2020; 9 pgs.
Office Action for Canadian Patent Application No. 3,113,495 dated Apr. 6, 2022; 5 pgs.

* cited by examiner

MACHINE LEARNING WITH DISTRIBUTED TRAINING

CROSS REFERENCE TO RELATED APPLICATION

The present application is a continuation of U.S. patent application Ser. No. 15/849,356, filed on Dec. 20, 2017, which is a continuation of U.S. patent application Ser. No. 15/717,796, filed on Sep. 27, 2017 and entitled "Shared Machine Learning," the contents of which are entirely incorporated herein by reference, as if fully set forth in this application. U.S. patent application Ser. No. 15/717,796 then claims priority to U.S. Provisional patent application Ser. No. 62/502,440, filed on May 5, 2017 and entitled "Machine Learning Auto Completion of Fields", the contents of which are entirely incorporated herein by reference, as if fully set forth in this application. Additionally, U.S. patent application Ser. No. 15/717,796 claims priority to U.S. Provisional patent application Ser. No. 62/517,719, filed on Jun. 9, 2017 and entitled "Machine Learning Pilot", the contents of which are entirely incorporated herein by reference, as if fully set forth in this application.

BACKGROUND

As an enterprise employs cloud-based network(s), such as remotely hosted services managed by a third party, those cloud-based network(s) may store data that is accessible by client devices on the enterprise's network. In some cases, the enterprise may seek to evaluate this data for various purposes. For example, the enterprise may seek to make various conclusions by evaluating the data, so as to help the enterprise to better organize the information presented by the data, to derive patterns from the data, to improve operational decisions, and/or improve workflow within the enterprise, among other possibilities.

Generally, to help facilitate the process of evaluating the data, the enterprise could rely on machine learning (ML) software, which executes algorithms that learn from and make predictions on data. Unfortunately, however, ML software could consume a high extent of the enterprise's computational resources and/or could be relatively costly for the enterprise to obtain.

SUMMARY

Disclosed herein is a cloud-based network system that provides a remote ML arrangement, which can be shared among various enterprise networks. The remote ML arrangement can securely generate ML model(s) and prediction(s) that are based on given enterprise's data and are accessible only to client devices on the given enterprise's network. In this way, the network system could help an enterprise to save time, to improve use of computing resources, and/or to reduce costs on specialized software, among other possible outcomes.

More specifically, the network system may include a computing system and a plurality of trainer devices. Each trainer device may be configured to execute one or more ML trainer processes that respectively generate ML model(s). The computing system may be configured to communicate with the enterprise network's client devices and to make an ML prediction based on a generated ML model. In this way, a client device could communicate with the computing system to effectively request the network system to carry out a certain prediction.

When a client device submits such a request, the client device could provide certain information to the computing system. In particular, the provided information could designate a portion of the enterprise's data (e.g., remotely stored at the computing system) as training data that should be used as basis for generating an ML model. Additionally, the provided information could indicate a target variable to be predicted using the ML model. For example, the client device could request the network system to predict categories for any uncategorized information within certain fields of a data table.

As such, once the computing system receives the information from the client device, the computing system may transmit an ML training request for reception by one of the plurality of trainer devices. For example, the computing system may transmit that ML training request to a scheduler device, and the scheduler device may then assign the ML training request to be served by a particular one of the ML trainer processes, which is executable by a particular one of the ML trainer devices. Once the ML training request has been assigned, the particular ML trainer process may then serve that ML training request.

When the particular ML trainer process serves the ML training request, the particular ML trainer device may engage in various communications with the computing system. Specifically, the computing system may provide the training data to the particular ML trainer device executing the particular ML trainer process. In practice, the computing system may do so after engaging in an authentication process to verify that the particular ML trainer process has permission to access that data, thereby securing the enterprise's data against unauthorized access. Moreover, once the ML model is generated based on the provided training data and according to the particular ML trainer process, the particular ML trainer device may then send the generated ML model to the computing system, and may also delete the training data stored at the particular ML trainer device, which may further secure the enterprise's data against unauthorized access.

Once the computing system receives the generated ML model from the particular ML trainer device, the computing system may then predict the target variable using the ML model. In particular, the computing system could execute an ML prediction Application Programming Interface (API) to predict the target variable using the ML model. In this regard, given that the ML prediction occurs separately from the ML model generation and occurs at the computing system, the computing system could feasibly carry out the prediction at any time once the computing system has the ML model, even if the computing system doesn't have an established network connection with any one of the trainer devices. Moreover, the computing system could use that same ML model to carry out additional prediction(s). Additionally or alternatively, the computing system could obtain updated ML model(s) and could use those updated ML model(s) to carry out additional prediction(s).

In any case, after the computing system carries out a prediction using an ML model obtained from one of the ML trainer devices, the computing system could send, to a client device, information related to that prediction. For example, the computing system could transmit information indicating the target variable to the client device, such as by causing a web browser of the client device to display the information indicating the target variable. In this way, an enterprise could securely obtain useful ML predictions without the enterprise having to dedicate significant computational resources for this purpose and without the enterprise having to invest in costly specialized software, among other advantages.

Accordingly, a first example embodiment may involve a network system including a plurality of trainer devices disposed within a remote network management platform and a computing system disposed within the remote network management platform. Each trainer device may be configured to execute one or more ML trainer processes. Additionally, the computing system may be configured to: receive information indicating (i) training data that is associated with the computing system and that is to be used as basis for generating an ML model and (ii) a target variable to be predicted using the ML model, where the information is received from a client device of a managed network, and where the remote network management platform remotely manages the managed network; transmit an ML training request for reception by one of the plurality of trainer devices, where the ML training request is based on the received information; provide the training data to a particular trainer device executing a particular ML trainer process that is serving the ML training request; receive, from the particular trainer device, the ML model that is generated based on the provided training data and according to the particular ML trainer process; predict the target variable using the ML model; and transmit, to the client device, information indicating the target variable.

A second example embodiment may involve receiving, by a computing system of a remote network management platform, information indicating (i) training data that is associated with the computing system and that is to be used as basis for generating an ML model and (ii) a target variable to be predicted using the ML model, where the information is received from a client device of a managed network, where the remote network management platform remotely manages the managed network, where a plurality of trainer devices are disposed within the remote network management platform, and where each trainer device is configured to execute one or more ML trainer processes. The second example embodiment may also involve transmitting, by the computing system, an ML training request for reception by one of the plurality of trainer devices, where the ML training request is based on the received information. The second example embodiment may additionally involve providing, by the computing system, the training data to a particular trainer device executing a particular ML trainer process that is serving the ML training request. The second example embodiment may further involve receiving, by the computing system from the particular trainer device, the ML model that is generated based on the provided training data and according to the particular ML trainer process. The second example embodiment may yet further involve predicting, by the computing system, the target variable using the ML model. The second example embodiment may yet further involve transmitting, by the computing system to the client device, information indicating the target variable.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
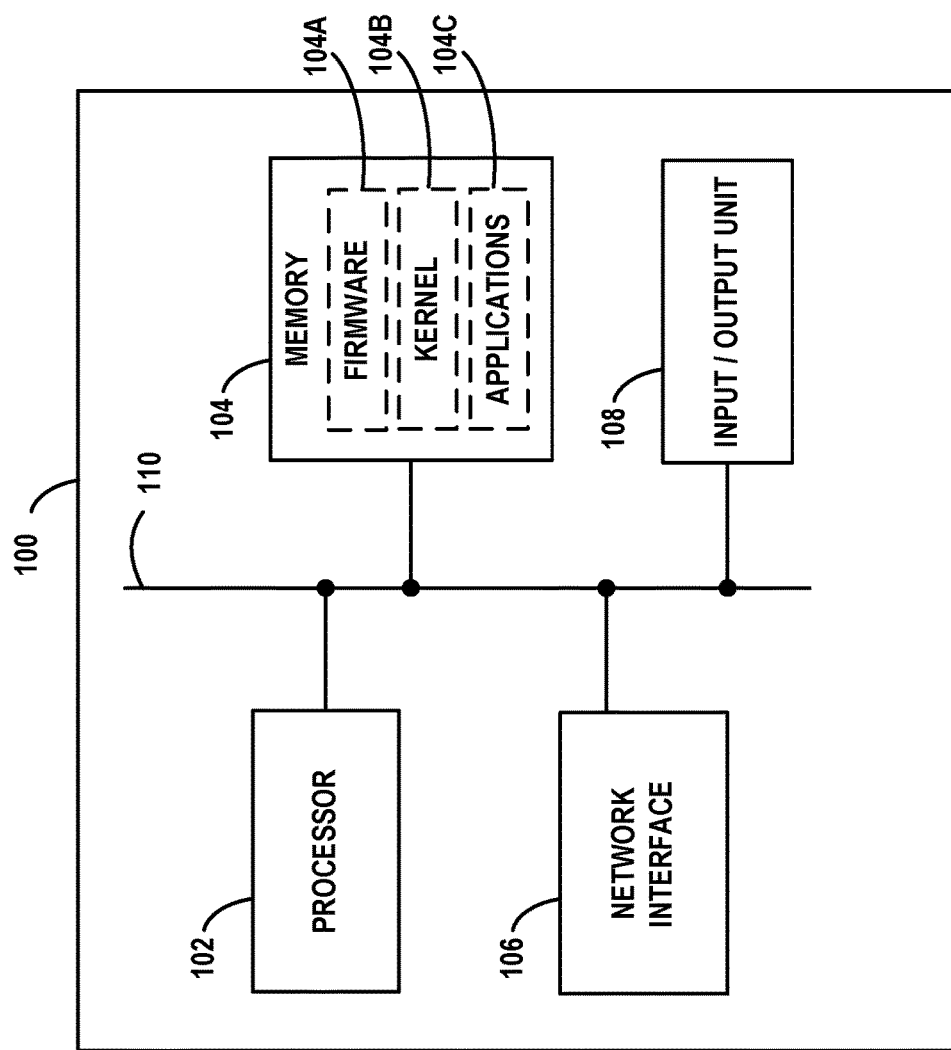
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
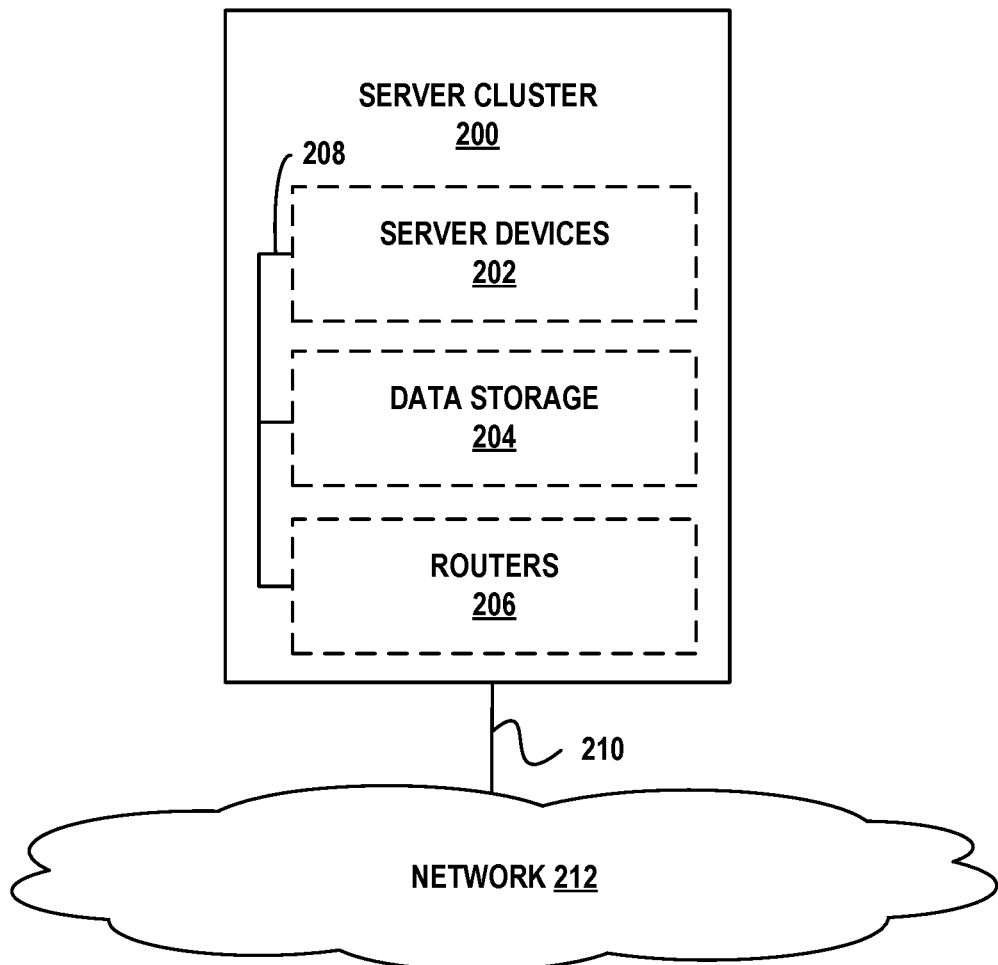
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
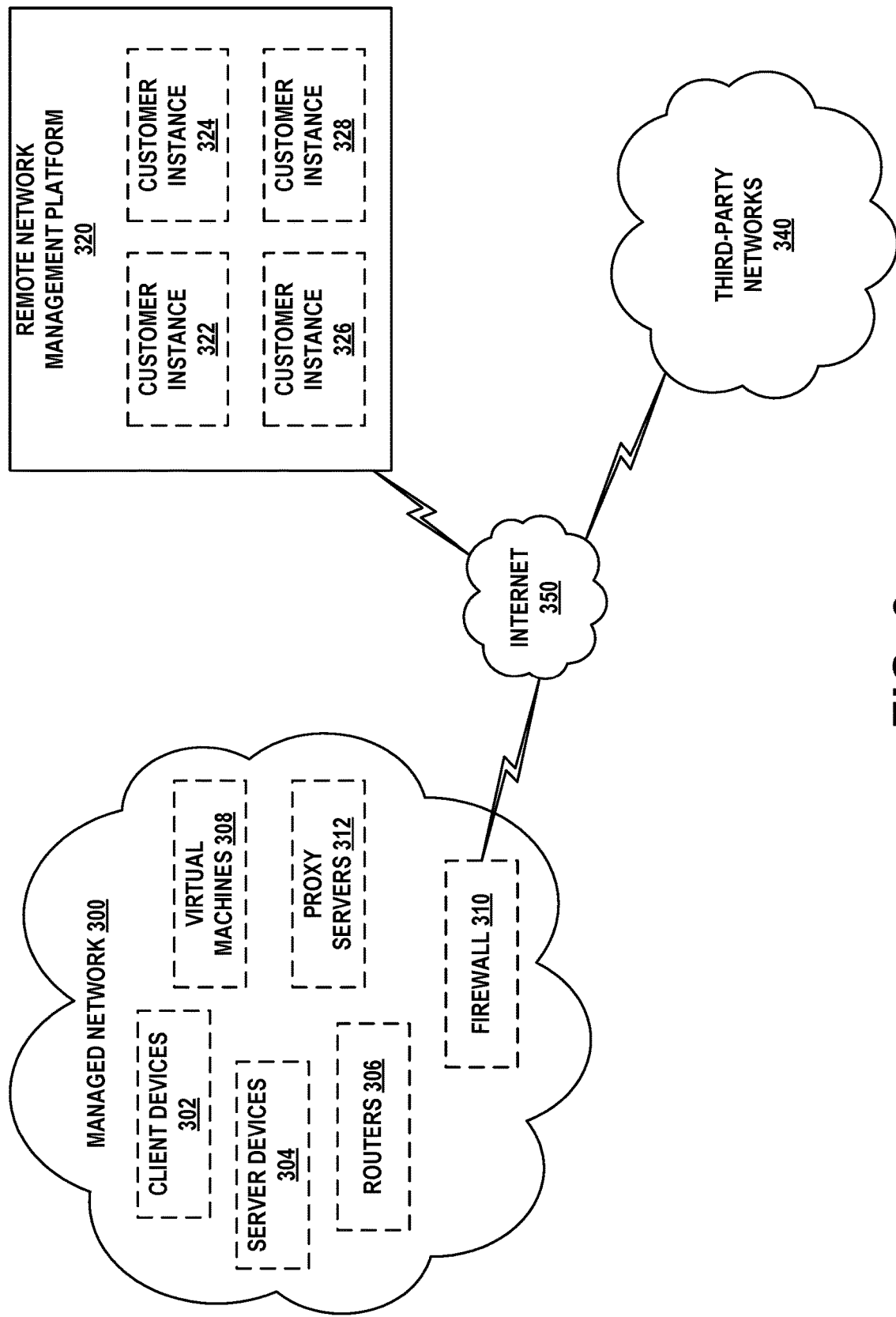
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
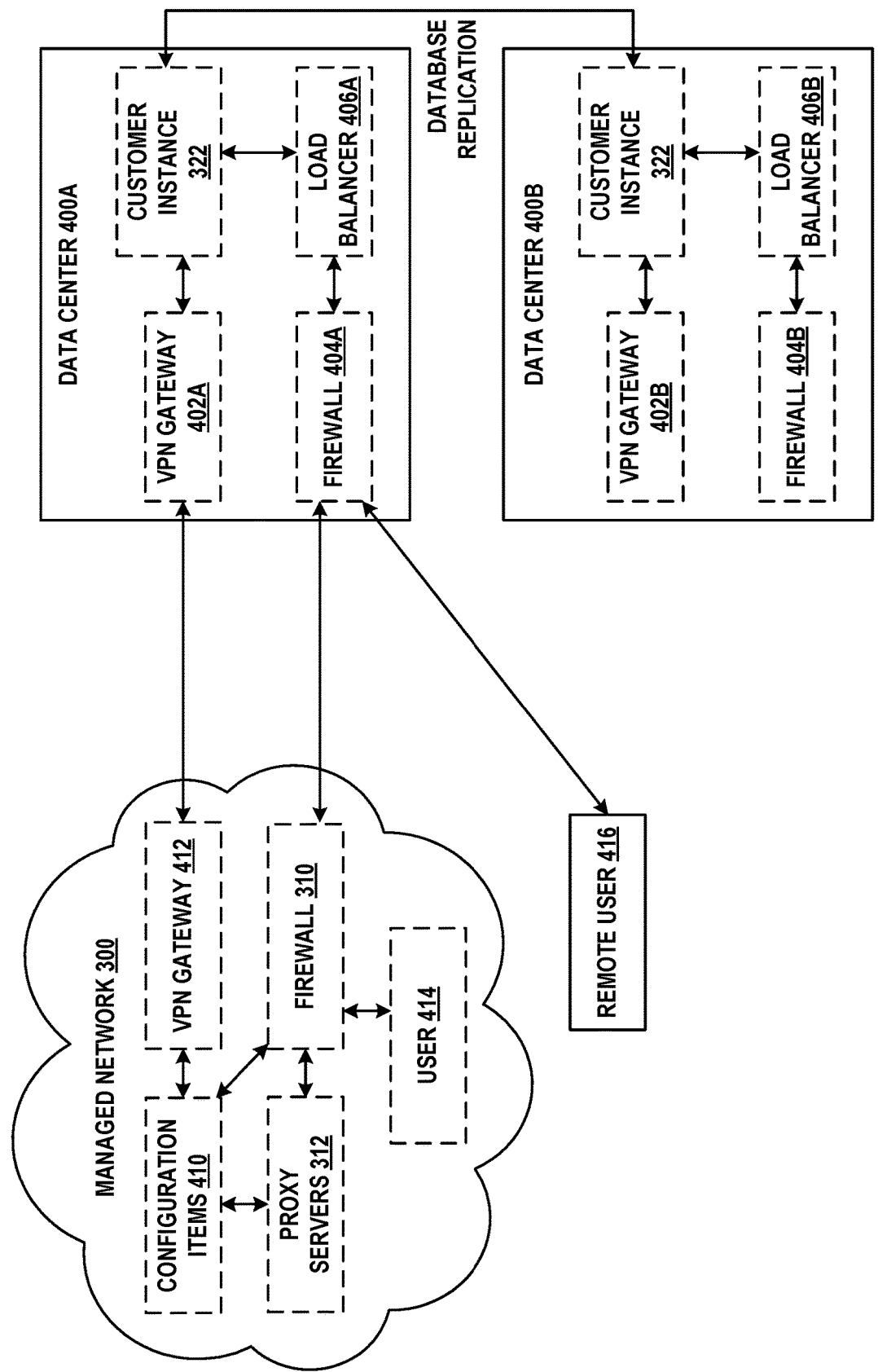
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by customer instance 322, or relationships between discovered devices, applications, and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
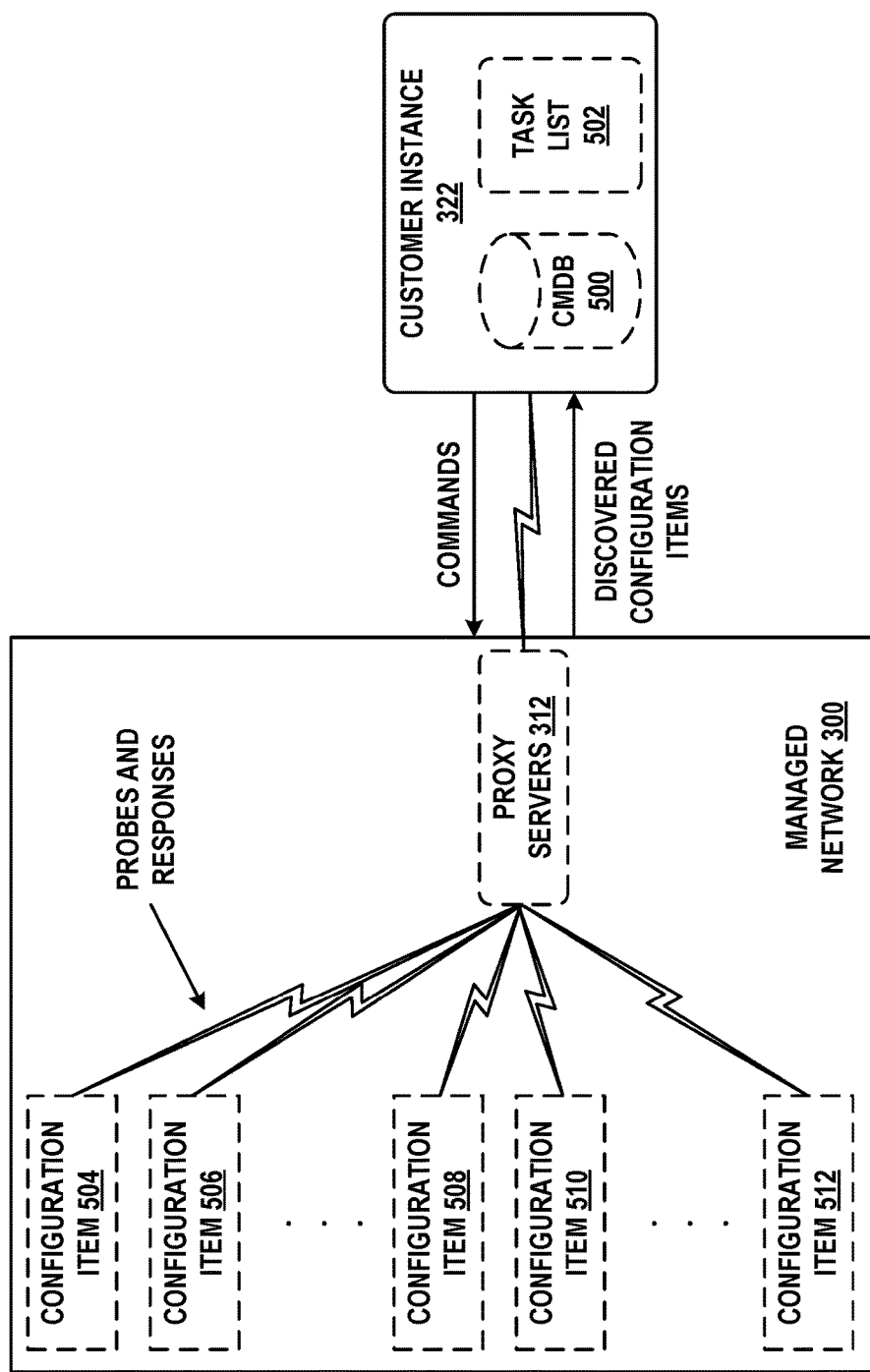
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
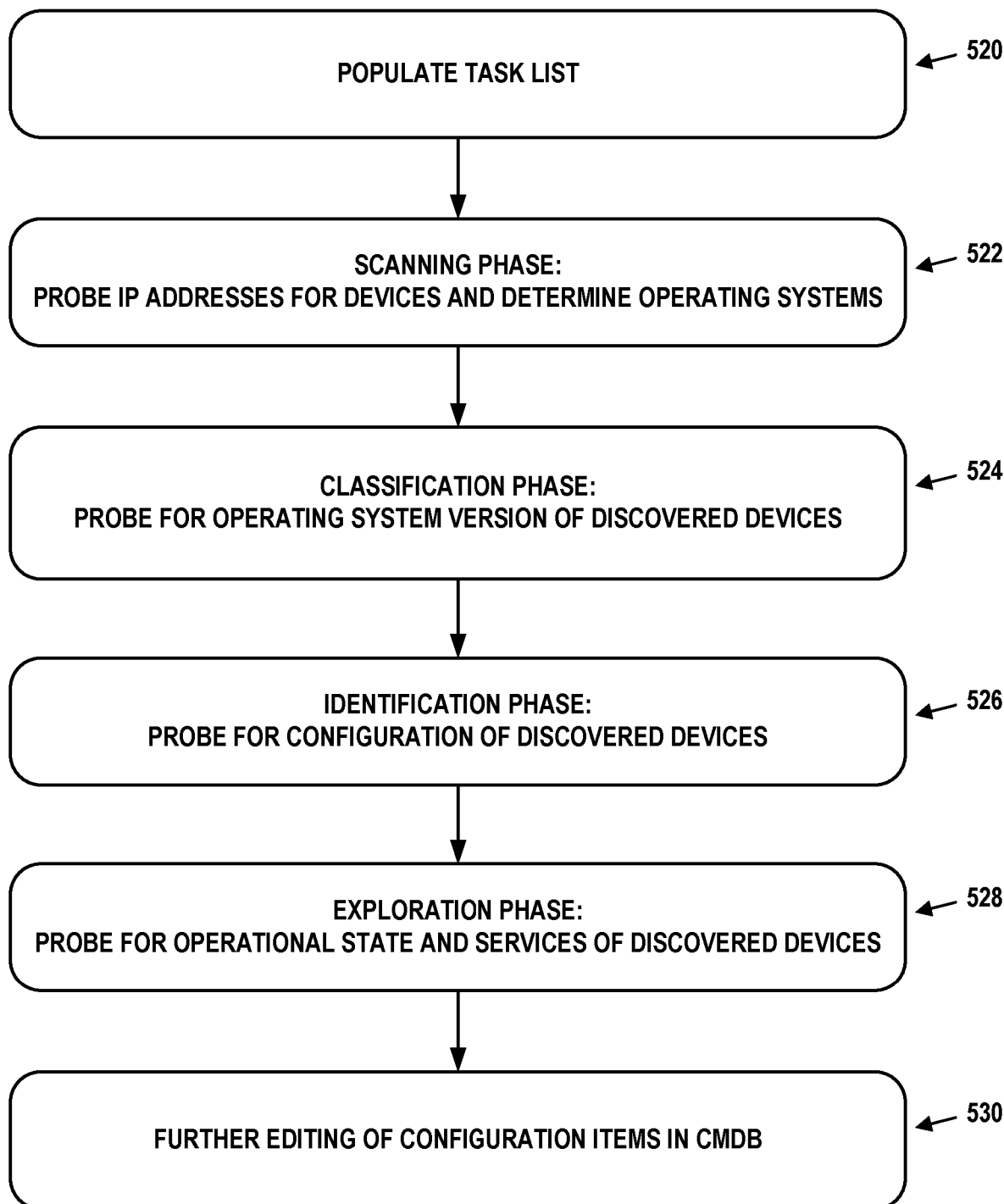
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE MACHINE LEARNING

Generally, machine learning (ML) relates to the ability of computers to learn from and make predictions based on data. In practice, ML may include a process of providing an ML algorithm with training data to learn from, so as to create an ML model by a training process. Specifically, the ML algorithm may find pattern(s) in the training data that map to a target variable (e.g., the answer an enterprise wants to predict) and may output an ML model that captures these pattern(s). Once an ML model is outputted, ML may then involve using that ML model to generate ML prediction(s) on new data for which the target variable is not yet known.

By way of example, an ML platform could be provided with training data taking the form of electronic mails (e-mails) that have been previously categorized and with a target variable corresponding to determination of categories for uncategorized emails. As such, the ML platform could then find pattern(s) in the training data that map to that target variable, and may output an ML model accordingly. For instance, the ML platform may determine that a relationship exists between times at which the categorized e-mails were received and respective categories assigned to those e-mails, and may then create an ML model according to that relationship. Once the ML model is created, the ML platform could use that ML model to categorize other e-mails that have not yet been categorized. Other examples are also possible.

VI. EXAMPLE SYSTEM TO FACILITATE SHARED MACHINE LEARNING

In line with the discussion above, disclosed herein is a network system that remotely facilitates generation of ML models and of ML predictions for various enterprise networks. In doing so, the network system could securely generate ML models and corresponding ML predictions on per customer instance basis. For example, a client device associated with a particular customer instance may submit a request for the network system to carry out a certain prediction and, once the network system generates an ML model and a corresponding ML prediction according to that request, the generated ML model and ML prediction may be accessible only to client devices associated with the particular customer instance. In this way, the network system could securely provide ML predictions that are specific to an enterprise while helping that enterprise save computing resources and/or reduce costs on specialized software, among other possible outcomes.

Figure 6:
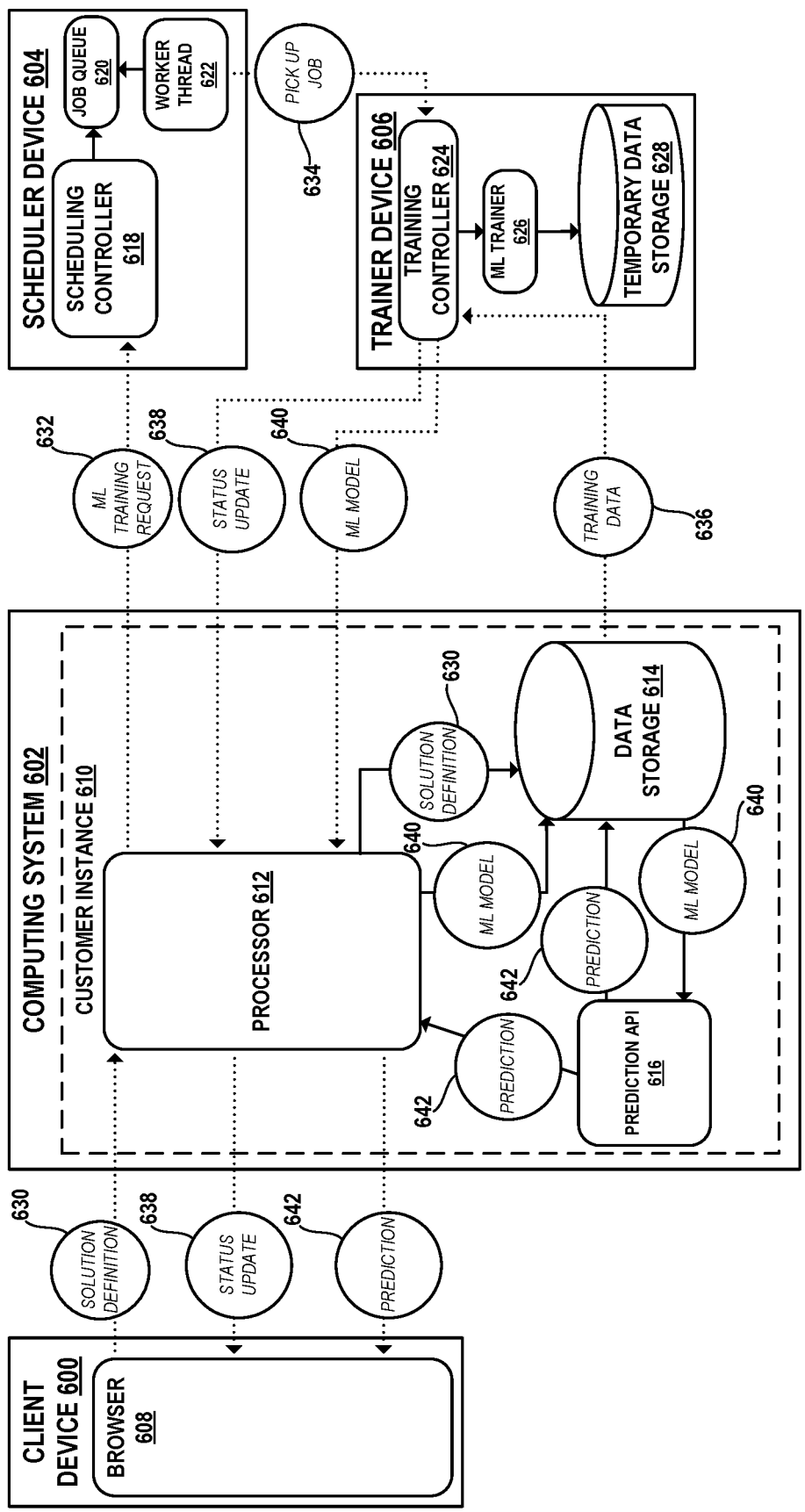
FIG. 6 depicts communication between a client device, a computing system, a scheduler device, and a trainer device, in accordance with example embodiments.

FIG. 6 illustrates features, components, and operations of a network system that facilitates generation of ML models and of ML predictions. In particular, FIG. 6 illustrates a client device 600 as well as a network system including a computing system 602, a scheduler device 604, and a trainer device 606. Trainer device 606 may be one of a plurality of trainer devices on the network system.

Although FIG. 6 illustrates a specific arrangement, it should be understood that various operations disclosed herein may be carried out in the context of similar and/or other arrangement(s) as well without departing from the scope of the present disclosure. Further, although the present disclosure is described in the context of a remote management network that remotely manages a managed network, it should be understood that aspects of the present disclosure may additionally or alternatively apply in other context(s) as well without departing from the scope of the present disclosure.

More specifically, FIG. 6 illustrates a client device 600, which may be one of the client devices 302 on the managed network 300. Generally, the client device 600 may engage in communication with the computing system 602, such as via wired and/or wireless communication link(s) (not shown). In this regard, the computing system 602 may be disposed within a remote network management platform, such as remote network management platform 320, so as to support remote management of the client device 600's managed network.

Moreover, as shown, the client device 600 may be configured to operate a web browser 608, which is a software application that may retrieve, present, and/or navigate through information on the World Wide Web. The browser 608 may include a web-display tool (not shown) that provides for or otherwise supports display of information, such as information received from the computing system 602. For example, as further discussed herein, the web-display tool may display information related to an ML prediction carried out by the network system. Other examples are also possible.

Computing system 602 may include computing resources that enable use of a customer instance 610 as discussed herein, which may be any one of the instances of the managed network 300. Given this, the computing system 602 may provide for some or all of the web portals, services, and/or applications available to the client device 600's managed network, thereby supporting management of that managed network via customer instance 610. And in accordance with the present disclosure, the customer instance 610 may include features that help carry out ML predictions. Specifically, the customer instance 610 may include a processor 612, data storage 614, and a prediction Application Programming Interface (API) 616.

The processor 612 may be configured to coordinate operations within the customer instance 610 and to engage in various communications with the client device 600, the scheduler device 604, and the trainer device 606. For example, the processor 612 may be configured to receive a "solution definition" from the client device 600. As further discussed herein, the solution definition may provide information designating certain data (e.g., data stored at the customer instance 610) as training data that should be used as basis for generating an ML model and may also provide information specifying a target variable to be predicted using the ML model. Additionally, the processor 612 may be configured to send an ML training request to the scheduler device 604, which, as further discussed herein, effectively triggers assignment of an ML trainer process to generate an ML model based on the the solution definition. Furthermore, the processor 612 may be configured to receive a generated ML model from the trainer device 606 and to store that ML model within the customer instance 610. Moreover, the processor 612 may be configured to store, within the customer instance 610, an ML prediction that is based on the ML model and to transmit the ML prediction to the client device 600.

Data storage 614 may be configured to store data associated with the customer instance 610. For example, the data storage 610 may store any data obtained and/or generated by the enterprise network of the client device 600. In line with the present disclosure, at least a portion of that data could be designated as training data according to a solution definition. In another example, the data storage 610 may store a solution definition received from a client device and/or an ML model received from an ML trainer device. In yet another example, the data storage 610 may store an ML prediction, such as by storing information indicating a predicted target variable. Other examples are also possible.

Prediction API 616 may be configured to use ML model(s) to generate ML prediction(s). In practice, the prediction API 616 may be any currently available and/or future developed API arranged for the purpose of generating various types of ML predictions. For example, the prediction API 616 could be specifically arranged to use ML model(s) to categorize an enterprise network's files, to determine priority of tasks listed in an enterprise network's task list, and/or to determine assignments for those tasks (e.g., determine an enterprise's department that should carry out the task), among others.

Further, scheduler device 604 may also be disposed within the remote network management platform and may be configured to schedule the serving of ML training requests amongst a plurality of ML trainer devices. The remote network management platform may include a plurality of ML trainer devices each configured to execute one or more ML trainer processes, with each ML trainer process being configured to serve one ML training request at a time. Given this, the disclosed ML arrangement could be a shared service, as each of a plurality of customer instances could provide one or more ML training requests. Thus, the scheduler device 604 could coordinate the serving of those ML training requests by assigning an ML trainer process respectively to each ML training request, perhaps doing so based on one or more factors as further discussed herein.

By way of example, the scheduler device 604 could receive a first ML training request from a first computing system that enables use of a first customer instance as well as a second ML training request from a second computing system that enables use of a second customer instance. Responsively, the scheduler device 604 may assign the first ML training request to a first ML trainer process, which may cause a first ML trainer device to execute the first ML trainer process serving the first ML training request, and may assign the second ML training request to a second ML trainer process, which may cause a second ML trainer device to execute the second ML trainer process serving the second ML training request.

In this example, the ML trainer devices and/or the ML trainer process could be the same as or different from one another.

In one case, the scheduler device 604 may assign the first and second ML training requests to different ML trainer processes executed by different ML trainer devices. Accordingly, in this case, the second ML trainer device may be different from the first ML trainer device and the second ML trainer process may be different from the first ML trainer process. Moreover, the first and second ML trainer processes could be respectively assigned to serve the first and second ML training requests at substantially the same time and/or at substantially different times.

In another case, the scheduler device 604 may assign the first and second ML training requests to different ML trainer processes executed by the same ML trainer device. Accordingly, in this case, the first and second ML trainer devices may be the same particular trainer device, but the second ML trainer process may be different from the first ML trainer process. Here again, the first and second ML trainer processes could be respectively assigned to serve the first and second ML training requests at substantially the same time and/or at substantially different times.

In yet another case, the scheduler device 604 may assign the first and second ML training requests to the same ML trainer process. Accordingly, in this case, the first and second ML trainer devices may be the same particular trainer device and the first and second ML trainer processes may be the same particular ML trainer process. Moreover, in this case, the particular ML trainer process may be assigned to serve one ML training request at a time. For instance, the scheduler device 604 may be configure to determine that the particular ML trainer process is available after completing serving of the first ML training request, and may then responsively assign the second ML training request to the particular ML trainer process. Other examples and cases are also possible.

To help schedule the serving of ML training requests amongst a plurality of ML trainer devices, the scheduler device 604 may include a scheduling controller 618, a job queue 620, and a worker thread 622.

The scheduling controller 618 may be configured to initiate operations within the scheduler device 604 in response to receiving an ML training request. For example, the scheduling controller 618 may store information related to a received ML training request, such as an identifier of the customer instance from which the ML training request has been received and/or an identifier of a solution definition that provides basis for the ML training request, among others. In another example, the scheduling controller 618 may create new ML training jobs in the job queue 620 feature based on received ML training requests.

The job queue 620 feature may include a listing of pending ML training jobs in accordance with ML training requests submitted by the computing system 602 and/or other computing system(s), which may include ML training requests that are yet to be served by an ML trainer process and/or ML training requests for which service is in-progress, among other possibilities. Given this, the scheduling controller 618 could create, based on a received ML training request, a new ML training job in the job queue 622.

The worker thread 622 controller may be configured to manage ML training jobs listed in the job queue 620. For instance, the worker thread 622 controller may inform a particular ML trainer device that a particular ML training job is being assigned to a particular ML trainer process executable by the particular ML trainer device. When doing so, the worker thread 622 controller could also provide an identifier of the particular customer instance associated with that particular ML training job, so that the particular ML trainer device could engage in communications with that particular customer instance as further discussed herein.

Yet further, ML trainer device 606 may be one of a plurality of ML trainer devices disposed within the remote network management platform. Each such ML trainer device may be respectively configured to execute one or more ML trainer processes that can serve one or more ML training requests by generating corresponding ML model(s). Moreover, in practice, some or all of the ML trainer devices could be at the same geographical location as one another and/or some or all of the ML trainer devices could be at geographical locations that are different from one another. Nonetheless, a given ML trainer device, such as ML trainer device 606, may include a training controller 624, an executable ML trainer 626 process, and temporary data storage 628.

The training controller 624 may be configured to initiate operations within the trainer device 606 as well as to engage in communication with the computing system 602 and/or the scheduler device 604. For example, the training controller 624 may receive or otherwise pick up an ML training job from the scheduler device 604. In another example, the training controller 624 may receive and store information related to a received ML training job (e.g., an identifier of the customer instance from which the corresponding ML training request has been received). In yet another example, the training controller 624 may initiate the serving of an ML training request (corresponding to a received ML training job) by an ML trainer process, such as ML trainer 626 process. In yet another example, the training controller 624 may obtain training data from a customer instance, such as customer instance 610, and may store that training data in the temporary data storage 628. In yet another example, the training controller 624 may determine a status of a given ML training job, so that the training controller 624 can inform a customer instance of that determined status. In yet another example, once an ML model has been generated, the training controller 624 may provide that ML model to a customer instance. Other examples are also possible.

In this regard, to facilitate determination of a status of a given ML training job, the training controller 624 may refer to the job queue 620 and/or may query the ML trainer 626 process, among other possibilities. For example, if the training controller 624 determines that a given ML training job is listed in the job queue 620, then the training controller 624 may responsively determine that the ML training job is pending. In another example, if the training controller 624 determines that a given ML training job is being served by the ML trainer 626 process, then the training controller 624 may responsively determine that the ML training job is in-progress. In yet another example, if the training controller 624 determines that a given ML training job is no longer in the job queue 620 and is no longer being served by the ML trainer 626 process, then the training controller 624 may responsively determine that the ML training job is complete. Other examples are possible as well.

The ML trainer 626 process may take the form of any ML algorithm, code, routine or the like that is executable by the ML trainer device 606 to learn from training data, so as to create an ML model by a training process. Examples of ML trainer processes may include (without limitation): Decision Trees, Naïve Bayes Classification, Least Squares Regression, and Logistic Regression, among others. As such, the ML trainer 626 process may be any currently available and/or future developed ML trainer process arranged for the purpose of generating various types of ML models. For example, the ML trainer 626 process could be specifically arranged to generate ML model(s) that help categorize an enterprise network's files, that help determine priority of tasks listed in an enterprise network's task list, and/or that help determine assignments for those tasks, among others. Other examples are possible as well.

The temporary data storage 628 may be configured to temporarily store training data. In particular, once the trainer device 606 obtains training data from the customer instance 610, the trainer device 606 may store that training data in the temporary data storage 628 while the ML trainer 626 process is serving a corresponding ML training request. In this way, the ML trainer 626 process could refer to the training data stored in the temporary data storage 628, so as to learn from that training data for the purpose of generating an ML model. However, once the trainer device 606 (e.g., the training controller 624) determines that the ML trainer 626 process completed the serving of the corresponding ML training request, the trainer device 606 may delete the training data from the temporary data storage 628. As such, the trainer device 606 could store training data for each ML training request being served at the trainer device 606 and, once service of a given ML training request is complete, the trainer device 606 may delete the training data stored in association with that given ML training request. In this manner, due to the temporary storage of training data, the disclosed ML arrangement helps secure an enterprise's data against unauthorized access. Other arrangements are possible as well.

In a system arranged as described above, the client device 600, the computing system 602, the scheduler device 604, and/or the ML trainer device 606 may engage in various communications with one another. In practice, these communications may trigger one or more operations by respective features/components of the client device 600, the computing system 602, the scheduler device 604, and/or the ML trainer device 606, such as operations described above with reference to FIG. 6, among others. Moreover, although particular communications are described in a particular order, it should be understood that these communications could be carried out in any feasible order, that one or more of these communications could be eliminated, and that one or more other communication could also be carried out to facilitate aspects of the present disclosure.

More specifically, the computing system 602 may receive a solution definition 630 from the client device 600. Generally, the client device 600 may transmit the solution definition 630 in response to receiving input data (e.g., provided by a user) specifying the information included in the solution definition 630. By way of example, the input data may be received via the browser 608 (e.g., via a graphical user interface (GUI) displayed by the browser 608) and the browser 608 may responsively transmit the solution definition 630 to the processor 612 as shown by FIG. 6.

In this regard, the solution definition 630 may include information according to which the network system could ultimately generate an ML model and an ML prediction.

In particular, as noted, the solution definition 630 may provide information designating certain data as training data that should be used as basis for generating an ML model. For example, the solution definition 630 may include a reference to specific data stored at the customer instance 610, so as to designate that data as training data. In a specific example, this reference could be a reference to particular cell(s), column(s), and/or row(s) within an electronic spreadsheet, such as those that include previously categorized information, for instance. In another example, the solution definition 630 received from the client device 600 may include the data that is the training data to be used as basis for generating an ML model. In a specific example, the client device 600 may send, to the processor 612 as part of the solution definition 630, one or more files that include the training data. Other examples are also possible.

Additionally, as noted, the solution definition 630 may provide information specifying a target variable to be predicted using the ML model. For example, the target variable could relate to categorization of information, prioritization of tasks, and/or determination of task assignments, among others. In a specific example, the solution definition 630 may include a reference to an empty column in an electronic spreadsheet that is intended to specify respective categories for uncategorized information listed in other portions of the electronic spreadsheet. In this example, the target variable thus relates to categorization of uncategorized information in the electronic spreadsheet. Other examples are also possible.

In some cases, the solution definition 630 may also specify a type of ML trainer process that should be used to generate an ML model. For example, the solution definition 630 could specify that one or more of the following ML trainer processes should be used: Decision Trees, Naïve Bayes Classification, Least Squares Regression, and Logistic Regression. In this regard, the type of ML trainer process to be used for generating an ML model could be selected, recommended, and/or otherwise determined based on various factor(s), such as based on preferences of the customer instance, on the provided training data, and/or on the target variable to be determined, among other options. Other examples are also possible.

In yet other cases, the solution definition 630 may also specify training time(s) according to which the scheduler device 604 is to ultimately assign the serving of corresponding ML training request(s). More specifically, the solution definition 630 could specify a single training time, multiple training times, and/or a training schedule, among other options.

In a specific example, the solution definition 630 could specify first and second training times. As a result, the scheduler device 604 could initially receive a first ML training request based on the solution definition 630 and could assign an ML trainer process to serve that first ML training request at the first training time specified in the solution definition 630, so as to generate an ML model. Then, the scheduler device 604 could receive a second ML training request based on the same solution definition 630 and could assign an ML trainer process to serve that second ML training request at the second training time specified in the solution definition 630, so as to generate an updated ML model, perhaps based on updated training data as further discussed herein.

In yet another example, the solution definition 630 could specify a periodic training schedule. For instance, the solution definition 630 could specify that the ML model should be updated once per day. As a result, the scheduler device 604 could periodically receive ML training requests based on the solution definition 630 and could assign ML trainer process(es) to respectively serve those ML training requests according to the periodic training schedule, so as to periodically update the ML model. Other examples are also possible.

Once the computing system 602 receives the solution definition 630 from the client device 600, the computing system 602 may responsively carry out certain operations. For example, the processor 612 may respond to receiving the solution definition 630 by storing the solution definition 630 at the data storage 614. Additionally, the processor 612 may respond to receiving the solution definition 630 by transmitting an ML training request 632 for reception by one of the plurality of trainer devices. Specifically, the processor 612 may transmit, to the scheduling controller 618, an ML training request 632 that is based on or otherwise corresponds to the solution definition 630. In practice, the ML training request 632 may specify an identifier of the solution definition 630 and/or an identifier of the customer instance 610, among others.

After the scheduling device 604 receives the ML training request 632 from the computing system 602, the scheduling device 604 may responsively carry out certain operations to assign the ML training request 632 to a given one of the ML trainer processes. In particular, the scheduling controller 618 may respond to the ML training request 632 by creating a new ML training job for the ML training request 632 in the job queue 620 feature. In this way, the worker thread 622 controller may ultimately manage this ML training job.

When the worker thread 622 controller manages the ML training job, the worker thread 622 controller may send a "pick up job" message 634 to the trainer device 606, which may indicate an assignment of the ML trainer 626 process to the ML trainer job associated with the ML training request 632. In turn, this may effectively cause the ML trainer 626 process to serve the ML training request 632. Moreover, the "pick up job" message 634 could specify the identifier of the customer instance 610 and/or the identifier of the solution definition 630, so that the trainer device 606 could, as further discussed herein, obtain training data 636 from the customer instance 610, provide a status update 638 to the customer instance 610 and/or provide an ML model 640 to the customer instance 610, among other options.

In this regard, when the scheduler device 604 assigns a particular one of the network system's ML trainer processes to serve the ML training request 632, the scheduler device 604 could do so based on one or more factors.

In one example, the scheduler device 604 may assign the ML training request 632 to an ML trainer process based on availability of the ML trainer process. For instance, the scheduler device 604 may determine that the ML trainer 626 process is available to serve the ML training request 632 (e.g., that the ML trainer 626 process is not currently serving any other ML training request). In practice, the scheduler device 604 could determine availability of the ML trainer 626 process by querying the trainer device 606 and/or by maintaining and referring to an availability list (not shown), which may specify one or more ML trainer processes and may indicate availability respectively of each specified ML trainer process, among other options. Nonetheless, once the scheduler device 604 makes a determination that the ML trainer 626 process is available to serve the ML training request 632, the scheduler device 604 may assign the ML trainer 626 process to the ML training request 632 based on that determination.

In another example, the scheduler device 604 may assign the ML training request 632 to an ML trainer process based on consideration of geographical proximity of the ML trainer device executing the ML trainer process. In particular, the scheduler device 604 could make a determination that a geographic location of the trainer device 606 executing the ML trainer process 626 is threshold close to a geographic location of the computing system 602, and may assign the ML trainer 626 process to the ML training request 632 based on that determination. In one case, making this determination could involve determining that the geographic location of the trainer device 606 executing the ML trainer process 626 is physically closest, from among corresponding geographic locations of the plurality of ML trainer devices on the network system, to the geographic location of the computing system 602. In another case, making this determination could involve determining that a geographic location of the trainer device 606 executing the ML trainer process 626 is within a threshold distance away from the geographic location of the computing system 602. In any case, the scheduler device 604 may assign an ML training process executable by a ML trainer device that is geographically threshold close to (i.e., within a threshold of) a computing system submitting a given ML training request, which may help reduce or minimize network latency of subsequent communications between the computing system and the ML trainer device executing the assigned ML training process, among other advantages.

In this example, the scheduler device 604 could use one of various approaches to determine a geographic location of any one of the plurality of ML trainer devices on the network system. For instance, the scheduler device 604 could maintain and refer to a "trainer device locations" list (not shown), which may specify one or more ML trainer processes and, for each given ML trainer process, may respectively indicate a geographic location of the ML trainer device configured to execute that given ML trainer process.

Additionally, the scheduler device 604 could use one of various approaches to determine a geographic location of any one of the computing systems that respectively enable use of customer instances. For instance, the scheduler device 604 could maintain and refer to a "computing system locations" list (not shown), which may specify one or more customer instances and, for each given customer instance, may respectively indicate a geographic location of the computing system enabling use of that given customer instance.

In yet another example, the scheduler device 604 may assign the ML training request 632 to an ML trainer process based on consideration of a topographical location of the ML trainer device executing the ML trainer process. In particular, the scheduler device 604 could make a determination that a topographical location of the trainer device 606 executing the ML trainer process 626 is threshold close to the computing system 602, and may assign the ML trainer 626 process to the ML training request 632 based on that determination.

In this example, given a plurality of communication links respectively between the computing system 602 and the plurality of trainer devices, the determination at issue could involve, for instance, determining that a communication link between the computing system 602 and the trainer device 606 provides for the fastest data transmission speed from among the data transmission speeds provided by the plurality of communication link. In another case, this determination could involve determining that the communication link between the computing system 602 and the trainer device 606 provides for a data transmission speed that is faster than a threshold speed. In any case, here again, the scheduler device 604 may help reduce or minimize network latency of subsequent communications between the computing system and the ML trainer device executing the assigned ML training process, among other advantages.

In yet another example, the scheduler device 604 may assign the ML training request 632 to an ML trainer process based on consideration of performance metric(s) associated with ML trainer device(s). In particular, the scheduler device 604 may determine performance metric(s) respectively for each of one or more ML trainer device(s). Generally, performance metric(s) of a given ML trainer device may include (without limitation): a memory usage level of the given ML trainer device, central processing unit (CPU) performance of the given ML trainer device, disk input/output (I/O) performance of the given ML trainer device, and/or network performance of the given ML trainer device, among others. Once the scheduler device 604 determines the performance metric(s), the scheduler device 604 may assign the ML training request 632 to an ML trainer process executable by an ML trainer device having performance metric(s) that meet a certain criteria.

For instance, the scheduler device 604 may assign the ML training request 632 to an ML trainer process executable by an ML trainer device having performance metric(s) that are above or below certain performance threshold(s). In a specific case, the scheduler device 604 may assign the ML training request 632 to an ML trainer process executable by an ML trainer device having a memory usage level that is lower than a threshold usage level. In another specific case, the scheduler device 604 may assign the ML training request 632 to an ML trainer process executable by an ML trainer device having a memory usage level that is lower than respective memory usage levels of one or more other ML trainer devices being evaluated.

In some implementations, the scheduler device 604 could receive recommendation(s) or may otherwise determine recommended ML trainer device(s) to which the scheduler device 604 could assign the ML training request 632. For instance, once the scheduler device 604 determines performance metric(s), the scheduler device 604 could determine a performance score respectively for each of a plurality of ML trainer devices. To do so for a given ML trainer device, the scheduler device 604 could assign a weight respectively to each performance metric determined for that given ML trainer device, and could then determine a performance score for the given ML trainer device according to a weighted average of these performance metrics. As such, once the scheduler device 604 determines a performance score respectively for each of the plurality of ML trainer devices, the scheduler device 604 could select one or more of these ML trainer devices as recommended ML trainer devices based on certain criteria. For instance, the scheduler device 604 could select, as recommended ML trainer device(s), ML trainer device(s) that each respectively have a determined performance score higher than a threshold performance score. Accordingly, the scheduler device 604 may assign the ML training request 632 to an ML trainer process executable by one of the recommended ML trainer devices. Other examples are also possible.

Once the trainer device 606 picks up an ML training job (e.g., receives the "pick up job" message 634) from the scheduler device 604, the trainer device 606 may then responsively carry out certain operations.

For instance, once the training controller 624 receives the "pick up job" message 634, the training controller 624 may obtain the training data 636 from the customer instance 610. To do so, the training controller 624 may transmit, to the customer instance 610, the identifier of the customer instance 610 and/or the identifier of the solution definition 630, which could be specified in the "pick up job" message 634 as noted above. In response to receiving the identifier of the customer instance 610 and/or the identifier of the solution definition 630, the customer instance 610 may then provide, to the training controller 624, the training data 636 specified in the solution definition 630, such as by providing a copy of the data designated as training data 636 by the solution definition 630, among other options. The training controller 624 may then store the provided training data 636 in the temporary data storage 628.

Moreover, after the training controller 624 receives the "pick up job" message 634, the training controller 624 may then facilitate execution of the ML trainer 626 process assigned to the ML training job associated with the ML training request 632. In doing so, the training controller 624 may cause the ML trainer 626 process to serve the ML training request by generating an ML model 640 according to the solution definition 630. Specifically, the ML trainer 626 process may learn from the training data 636 so as to generate an ML model 640 that could be used to predict the target variable indicated in the solution definition 630.

Further, in line with the discussion above, the training controller 624 could determine a status of the ML training job associated with the ML training request 632, so that the training controller 624 can inform the customer instance 610 of that determined status. As such, the training controller 624 may transmit, to the processor 612, a status update 638 indicating the status of the ML training job associated with the ML training request 632. The processor 612 could then transmit that status update 638 to the client device 600, such as for display by the browser 608, for instance. Moreover, when the training controller 624 provides a status update, the training controller 624 could do so upon request (e.g., sent by the client device 600 to the trainer device 606 via the computing system 602) and/or according to a schedule, among other options.

Yet further, once the trainer device 606 generates the ML model 640, the trainer device 606 may send the generated ML model 640 to the customer instance 610. In doing so, the trainer device 606 could also include the identifier of the customer instance 610 and/or the identifier of the solution definition 630. In this way, the customer instance 610 could use one or more of these identifiers to determine that the provided ML model 640 is associated with the solution definition 630 originally received from the client device 600. In this regard, once the customer instance 610 receives the ML model 640, the customer instance 610 (e.g., the processor 612) may store the ML model 640 in the data storage 614, so that the customer instance 610 could refer to this ML model 640 at any time.

Once the computing system 602 receives and stores the ML model 640, the computing system 602 may then predict the target variable indicated in the solution definition 630 using the ML model 640. In particular, the prediction API 616 may obtain the ML model 640 from the data storage 614 and may then use the ML model 640 to generate an ML prediction 642, such as by outputting the target variable indicated in the solution definition 630. For example, in line with the examples above, the target variable could relate to categorization of uncategorized information in the electronic spreadsheet. As such, in this example, the ML prediction 642 may include a prediction of categories for the uncategorized information in the spreadsheet or may otherwise involve an actual categorization of that previously uncategorized information in the spreadsheet, among other options. Other examples are also possible.

In this regard, the disclosed arrangement may allow the computing system 602 to carry out offline prediction(s). In particular, in line with the discussion above, the disclosed arrangement provides for ML prediction(s) to be carried out separately from the ML model generation, specifically being carried out by the computing system 602. As a result, the computing system 602 could feasibly generate the ML prediction 642 at any time as long as the computing system 602 has the ML model 640 stored thereon. For example, the prediction API 616 could use the ML model 640 stored in the data storage 614 to predict the target variable indicated in the solution definition 630, and could do so even if the computing system 602 doesn't have an established network connection with any one of the trainer devices.

Nonetheless, after the computing system 602 generates the ML prediction 642, the computing system 602 may then provide the ML prediction 642 to the client device 600. In one case, the prediction API 616 may store the ML prediction 642 in the data storage 614, and the processor 612 may obtain the ML prediction 642 from the data storage 614 and may then transmit the ML prediction 642 to the client device 600. In another case, the processor 612 may obtain the ML prediction 642 directly from the prediction API 616 and may then transmit the ML prediction 642 to the client device 600. In either case, when the processor 612 transmits the ML prediction 642 to the client device 600, the processor 612 may provide information indicating the target variable. For example, the processor 612 may provide information indicating categories determined respectively for each of a plurality of previously uncategorized files.

Moreover, once the client device 600 receives the ML prediction 642 from the computing system 602, the client device 600 may responsively present that ML prediction 642 in some manner. For example, the browser 608 may use the above-mentioned web-display tool to display information indicating the target variable, such as by displaying graphics, text, numbers, and/or other characters representative of the target variable. In another example, the client device 600 may use an audio output device to output an audible notification representative of the target variable. Other examples are also possible.

In a further aspect, the disclosed arrangement could allow for use that same ML model to carry out multiple prediction(s). For instance, the client device 600 could effectively request a prediction by providing the solution definition 630 to the computing system 602, and may then receive the prediction 642 as discussed. Then, the client device 600 could request the computing system 602 to generate and provide another prediction using that same ML model 640, and the computing system 602 could do so accordingly. In a specific example, once the computing system 602 has an ML model arranged for predicting a target variable related to categorizing files, the computing system 602 may use the ML model to categorize one set of previously uncategorized files. Then, the client device 600 could request the computing system 602 to use that ML model to categorize another set of previously uncategorized filed, and the computing system 602 could do so accordingly. Other examples are also possible.

In yet a further aspect, the disclosed arrangement could allow for prediction of multiple target variables. For instance, the computing system could receive information indicating first training data, second training data, a first target variable to be predicted using a first ML model, as well as a second target variable to be predicted using a second ML model. In this case, the computing system could transmit first and second ML training requests, so that the requests are respectively received for service by first and second ML trainer processes in line with the discussion above. Here again, the first and second ML trainer processes could be the same as or different from one another. Also, the first and second ML trainer processes could be respectively executed by first and second trainer devices, which could be the same as or different from one another. Further, the first and second training data could be the same as or different from one another. Moreover, the first and second ML trainer processes could respectively serve the first and second ML training requests at substantially the same time or at different times.

In any case, the first trainer device executing the first ML trainer process could provide the computing system with a first ML model that is generated based on the first training data and according to the first ML trainer process, and the computing system could then predict the first target variable using the first ML model and could transmit information indicating the first target variable to a client device. Similarly, the second trainer device executing the second ML trainer process could provide the computing system with a second ML model that is generated based on the second training data and according to the second ML trainer process, and the computing system could then predict the second target variable using the second ML model and could transmit information indicating the second target variable to a client device.

In yet a further aspect, in line with the discussion above, the disclosed arrangement could allow for generating an updated ML model and for using that updated ML model to carry out additional prediction(s). In particular, the computing system 602 could send another ML training request for reception by one of the plurality of trainer devices, and could do so in response to obtaining updated training data and/or according to training times specified by the solution definition 630, among other options. Additionally, when an ML trainer device is serving the other ML training request, the computing system 602 could provide the updated training data to that ML trainer device, so that the ML trainer device could generate an updated ML model based on the updated training data. Once the computing system 602 then receives the updated ML model from the trainer device, the computing system 602 could then use that updated ML model to generate additional prediction(s) and provide those prediction(s) to the client device 600. For instance, the computing system 602 could use the updated ML model to again predict the target variable indicated in the solution definition 630, and the computing system 602 could the transmit, to the client device 600, update information indicating the target variable predicted using the updated ML model.

In this regard, the particular ML trainer process generating the updated ML model could be the same as or different from the ML trainer 626 process that generated the original ML model 640. If the particular ML trainer process generating the updated ML model is different from the ML trainer 262 process that generated the original ML model 640, that particular ML trainer process could be executable by the same ML trainer device 606 that is also configured to execute the ML trainer 262 process or could be executable by a different ML trainer device.

Furthermore, the computing system 602 could obtain updated training data in various ways. For example, the client device 600 may send, to the computing system 602, an update to the solution definition 630, which may include a new reference to other data stored at the customer instance 610, so to designate that data as additional or alternative training data to be used for be used as basis for generating an updated ML model. In a specific example, this new reference could be a reference to additional or alternative cell(s), column(s), and/or row(s) within the above-mentioned electronic spreadsheet, such as those that include other previously categorized information, for instance. In another example, the client device 600 may send, to the computing system 602, new data designated as training data that should additionally or alternatively be used as basis for generating an updated ML model. In a specific example, the client device 600 may send, to the processor 612, one or more additional files that include additional training data. Other examples are also possible.

VII. ADDITIONAL SECURITY FEATURE

In yet a further aspect, the disclosed arrangement may provide a security feature that may further help secure an enterprise network's data. In particular, an ML trainer device could provide a secure identifier to a computing system when obtaining training data from the computing system, so that the computing system could verify that the ML training device is permitted to obtain the training data. In practice, the secure identifier may be a randomly generated bitstring, such as a security token cryptographically generated by the computing system. However, other secure identifiers are possible as well without departing from the scope of the present disclosure.

By way of example, to help facilitate this security feature, the computing system may transmit a randomly generated bitstring along with the ML training request for reception by one of the plurality of trainer devices, such as for reception by the scheduler device. Once the scheduler device then assigns an ML trainer process to serve the ML training request, the scheduler device may transmit the randomly generated bitstring to the ML trainer device configured to execute the assigned ML trainer process. Then, once the ML trainer device seeks to obtain training data from the computing system, the ML trainer device may send the randomly generated bitstring to the computing system, such as along with a request for the training data. As such, the computing system may verify that the randomly generated bitstring received from the ML trainer device is identical to the randomly generated bitstring originally transmitted by the computing system. And once the computing system completes this verification process, the computing system may responsively provide the training data to the ML trainer device.

VIII. EXAMPLE APPLICATION OF SHARED MACHINE LEARNING

In practice, the disclosed shared ML arrangement could be used by enterprise(s) or the like for a variety of applications. One example of such an application could involve ML predictions related to remaining disk space of an enterprise network. Based on the received ML predictions related to remaining disk space of the enterprise network, an enterprise could then make operational decisions, such as advance investment in additional disk space for the enterprise network, among other options.

By way of example, the computing system 602 could receive a solution definition indicating training data and a target variable in line with the discussion above. In this example, the training data could be a plurality of data points each indicating an extent of remaining disk space at a respective point in time. Additionally, the target variable could correspond to a request to predict a point in time at which the enterprise network will run out of disk space. Tables 1 and 2 below represent an example of such a solution definition.

TABLE 1

| | X (Time) | | | | | | |
|---|---|---|---|---|---|---|---|
| | January (1) | February (2) | March (3) | April (4) | May (5) | June (6) | July (7) |
| Y (Remaining Disk Space in Terabytes (TB)) | 2.5 | 2.1 | 2.0 | 1.5 | 1.5 | 1.3 | 0.9 |

TABLE 2

| Target Variable |
|---|
| Value(X) when Y = 0 |

Specifically, Table 1 shows training data corresponding to data points that indicate extent of remaining disk space respectively at each of various months of a given year. As shown, the remaining disk space is represented by the variable Y and the month is represented by the variable X. For instance, Table 1 shows that the enterprise network has 2.5 TB of remaining disk space in January (i.e., $1^{st}$ month of the year), that the enterprise network has 2.1 TB of remaining disk space in February (i.e., $2^{nd}$ month of the year), that the enterprise network has 2.0 TB of remaining disk space in March (i.e., $3^{rd}$ month of the year), and so on. Moreover, Table 2 shows a target variable corresponding to a request to predict a month at which the enterprise network will run out of disk space (e.g., a month at which the enterprise network will have 0 TB of disk space remaining).

Yet further, as noted, the solution definition could specify a type of ML trainer process that should be used to generate an ML model. For instance, in this example, the solution definition could specify use of linear regression techniques. As such, a trainer device may ultimately generate an ML model according to the specified type, such as by executing an ML trainer process that relies on linear regression techniques. Other features of the solution definition are possible as well.

Once the computing system 602 receives this solution definition, the computing system 602 may carry out the operations described in the context of FIG. 6, so as to obtain an ML model from the trainer device 606. In this example, the trainer device 606 could generate the ML model by executing an ML trainer process (e.g., ML trainer 626 process) that relies on linear regression techniques. As a result, the trainer device 606 could use the training data shown in Table 1 to generate a ML model that indicates the following Equation 1:

$$Y=-0.2464X+2.671 \quad \text{Equation 1}$$

Once the computing system 602 receives the generated ML model, the computing system 602 may carry out the operations described in the context of FIG. 6, so as to generate a prediction using the received ML model. In particular, the computing system 602 may predict a month at which the enterprise network will run out of disk space. To do so, the computing system 602 may insert a value of zero (0) into the variable Y of the above-mentioned Equation 1 and may then solve for the value of X. In this example, when the value of zero (0) is inserted into the variable Y of Equation 1, the resulting value of X is 10.84, which corresponds to the month of October (i.e. $10^{th}$ month of the year). As such, the computing system 602 may predict that the enterprise network will run out of disk space sometime in the month of October, and could provide this prediction to a client device of the enterprise network.

Moreover, in line with the discussion above, the computing system 602 could obtain an updated ML model based on updated training data and may then use that updated ML model to carry out another prediction. For instance, the computing system 602 could obtain another data point indicating 0.8 TB of remaining disk space in the month of August (8). Subsequently, the computing system 602 may carry out the operations described in the context of FIG. 6, so as to obtain an updated ML model from the trainer device 606. In this example, the trainer device 606 could generate the updated ML model by again executing the ML trainer process that relies on linear regression techniques. As a result, the trainer device 606 could use the training data shown in Table 1 along with the newly obtained data point to generate an updated ML model that indicates the following Equation 2:

$$Y=-0.2381X+2.646 \quad \text{Equation 2}$$

Once the computing system 602 receives the updated ML model, the computing system 602 may carry out the operations described in the context of FIG. 6, so as to generate a new prediction using the received updated ML model. In particular, the computing system 602 may again predict a month at which the enterprise network will run out of disk space. To do so, the computing system 602 may insert a value of zero (0) into the variable Y of the above-mentioned Equation 2 and may then solve for the value of X. In this example, when the value of zero (0) is inserted into the variable Y of Equation 2, the resulting value of X is 11.11, which corresponds to the month of November (i.e. $11^{th}$ month of the year). As such, the computing system 602 may newly predict that the enterprise network will run out of disk space sometime in the month of November, and could provide this new prediction to a client device of the enterprise network. Other examples are also possible.

IX. EXAMPLE OPERATIONS

Figure 7:
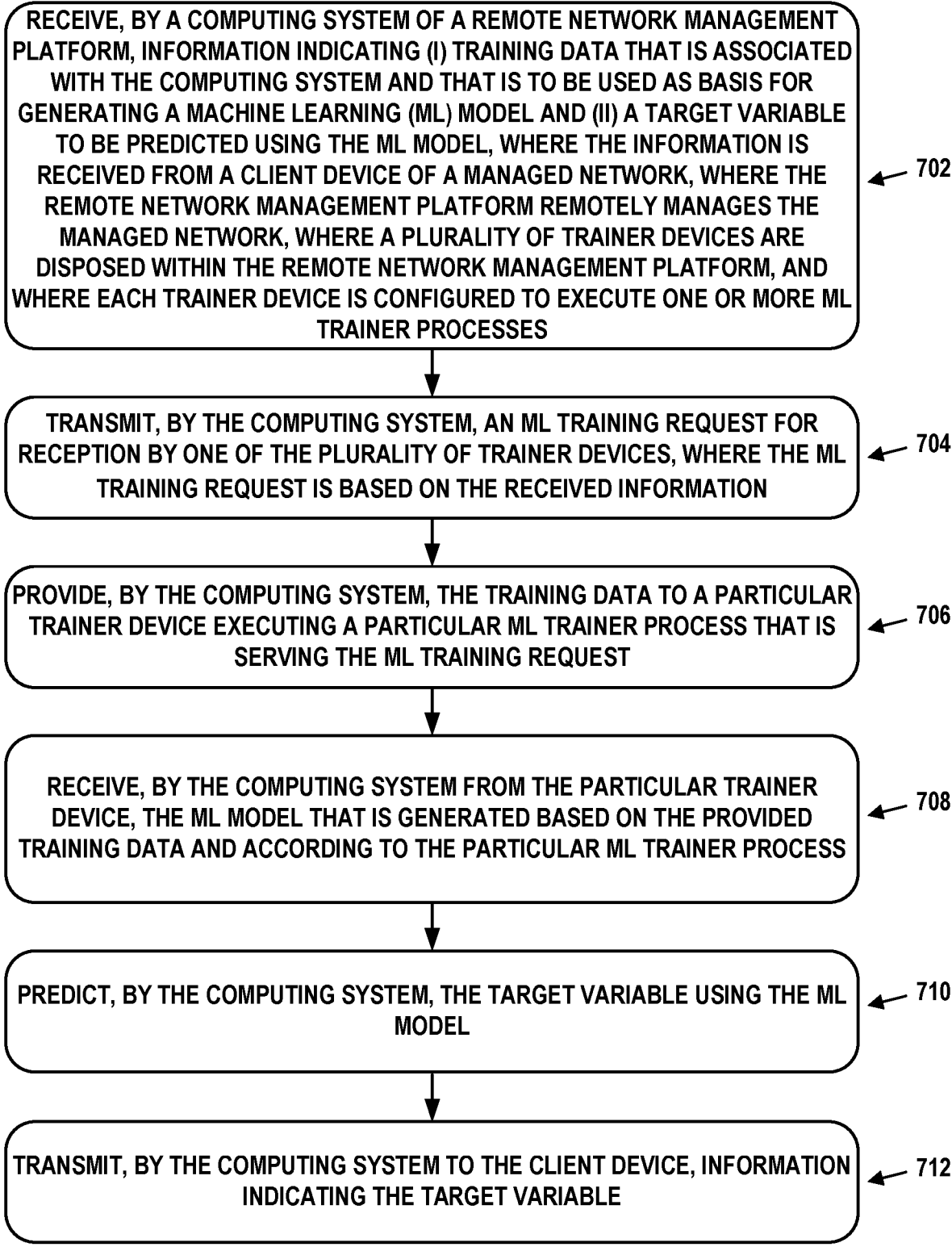
FIG. 7 is a flow chart, in accordance with example embodiments.

FIG. 7 is a flow chart illustrating an example embodiment. The process illustrated by FIG. 7 may be carried out by a computing system, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 7 may be simplified by the removal of any one or more of the features shown therein. Further, these embodiments may be combined with features, aspects, and/or implementations of any of the previous figures or otherwise described herein.

Block 702 may involve receiving, by a computing system of a remote network management platform, information indicating (i) training data that is associated with the computing system and that is to be used as basis for generating a machine learning (ML) model and (ii) a target variable to be predicted using the ML model, where the information is received from a client device of a managed network, where the remote network management platform remotely manages the managed network, where a plurality of trainer devices are disposed within the remote network management platform, and where each trainer device is configured to execute one or more ML trainer processes.

Block 704 may involve transmitting, by the computing system, an ML training request for reception by one of the plurality of trainer devices, where the ML training request is based on the received information.

Block 706 may involve providing, by the computing system, the training data to a particular trainer device executing a particular ML trainer process that is serving the ML training request.

Block 708 may involve receiving, by the computing system from the particular trainer device, the ML model that is generated based on the provided training data and according to the particular ML trainer process.

Block 710 may involve predicting, by the computing system, the target variable using the ML model.

Block 712 may involve transmitting, by the computing system to the client device, information indicating the target variable.

In some embodiments, transmitting the ML training request for reception by one of the plurality of trainer devices comprises transmitting the ML training request to a scheduler device for scheduling of the ML training request, where the scheduler device assigns the ML training request to the particular ML trainer process. Generally, the scheduler device may be disposed within the remote network management platform and may be configured to schedule service of ML training requests amongst the plurality of trainer devices.

In some embodiments, the scheduler device may be further configured to make a determination that a location of the particular trainer device is threshold close to a location of the computing system. In these embodiments, the scheduler device may assign the ML training request to the particular ML trainer process based at least on the determination that the location of the particular trainer device is threshold close to a location of the computing system.

In some embodiments, the scheduler device may be further configured to make a determination that the particular ML trainer process is available to serve the ML training request. In these embodiments, the scheduler device may assign the ML training request to the particular ML trainer process based at least on the determination that the particular ML trainer process is available to serve the ML training request.

In some embodiments, the computing system may be a first computing system, the ML training request may be a first ML training request, the particular trainer device may be a first trainer device, the particular ML trainer process may be a first ML trainer process, and the scheduler device may be further configured to: receive, from a second computing system disposed within the remote network management platform, a second ML training request for scheduling of the second ML training request; and, in response to receiving the second ML request, assign the second ML training request to a second ML trainer process, where assignment of the second ML training request to the second ML trainer process causes a second trainer device to execute the second ML trainer process serving the second ML training request.

In such embodiments, the second trainer device may be different from the first trainer device and the second ML trainer process may be different from the first ML trainer process, the first and second trainer devices may be the same particular trainer device and the second ML trainer process may be different from the first ML trainer process, or the first and second trainer devices may be the same particular trainer device and the first and second ML trainer processes may be the same particular ML trainer process.

Moreover, in a situation in which the first and second trainer devices are the same particular trainer device and the first and second ML trainer processes are the same particular ML trainer process, then the scheduler device may be further configured to determine that the particular ML trainer process is available after completing serving of the first ML training request. In this case, assigning the second ML training request to the particular ML trainer process is further in response to determining that the particular ML trainer process is available after completing serving of the first ML training request.

In some embodiments, the information received from the client device may specify a training time, and the scheduler device assigning the ML training request to the particular ML trainer process may involve the scheduler device assigning the particular ML trainer process to serve the ML training request at the specified training time.

In some embodiments, the computing system may be further configured to: transmit a randomly generated bitstring along with the ML training request for reception by one of the plurality of trainer devices; receive the randomly generated bitstring from the particular trainer device when the particular trainer device requests that the computing system provide the training data; verify that the randomly generated bitstring received from the particular trainer device is identical to the randomly generated bitstring transmitted by the computing system; and in response to the verifying, provide the training data to the particular trainer device.

In some embodiments, the particular trainer device may include a temporary data storage device and the particular trainer device may be configured to: store the training data at the temporary data storage device while the particular ML trainer process is serving the ML training request; and delete the training data from the temporary data storage device after the particular ML trainer process completes the serving of the ML training request.

In some embodiments, the ML training request may be a first ML training request, the particular trainer device may be a first trainer device, the particular ML trainer process may be a first ML trainer process, the target variable may be a first target variable, the ML model may be a first ML model, and the received information may also indicate (i) second training data that is associated with the computing system and that is to be used as basis for generating a second ML model and (ii) a second target variable to be predicted using the second ML model. In such embodiments, the computing system may be further configured to: (i) transmit a second ML training request for reception by one of the plurality of trainer devices, wherein the second ML training request is also based on the received information; (ii) provide the second training data to a second trainer device executing a second ML trainer process that is serving the second ML training request; (iii) receive, from the second trainer device, the second ML model that is generated based on the training data and according to the second ML trainer process; (iv) predict the second target variable using the second ML model; and (v) transmit, to the client device, information indicating the second target variable.

In some embodiments, the computing system may include a data storage device and may be configured to: store the receive ML model at the data storage device; and use the stored ML model to predict the target variable without the computing system having an established network connection to any one of the plurality of trainer devices.

In some embodiments, a web browser may operated by the client device, and transmitting, to the client device, information indicating the target variable may involve causing the web browser to display the information indicating the target variable.

In some embodiments, the ML training request may be a first ML training request, the particular trainer device may be a first trainer device, the particular ML trainer process may be a first ML trainer process, the first ML trainer process may serving the first ML training request at a first training time, and the computing system is further configured to: transmit a second ML training request for reception by one of the plurality of trainer devices, where the second ML training request is also based on the received information; provide updated training data to a second trainer device executing a second ML trainer process that is serving the second ML training request, wherein the second ML trainer process is serving the second ML training request at a second training time after the first training time; receive, from the second trainer device, an updated ML model that is generated based on the updated training data and according to the second ML trainer process; predict the target variable using the updated ML model; and transmit, to the client device, updated information indicating the target variable predicted using the updated ML model.

In such embodiments, the first and second trainer devices may be the same particular trainer device and the second ML trainer process may be different from the first ML trainer process. Alternatively, the first and second trainer devices may be the same particular trainer device and the first and second ML trainer processes may be the same particular ML trainer process.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
a plurality of machine learning (ML) trainer devices; and
a scheduler device configured to:
receive an ML training request from a computational instance;
assign the ML training request to a particular ML trainer device of the plurality of ML trainer devices, wherein the ML training request identifies: training data to be used as basis for generating an ML model, and a target variable to be predicted using the ML model; and
provide an identifier of the computational instance to the particular ML trainer device, wherein the identifier enables direct communication between the particular ML trainer device and the computational instance;

wherein assigning the ML training request comprises causing the particular ML trainer device of the plurality of ML trainer devices to: receive the training data from the computational instance, train the ML model using the received training data to predict the target variable, and provide the trained ML model to the computational instance for local use on the computational instance.

2. The system of claim 1, wherein the ML training request is based on information received by the computational instance from a client device of a managed network, and wherein the information received from the client device identifies the training data and the target variable.

3. The system of claim 2, wherein the information received from the client device specifies a training time, wherein assigning the ML training request to the particular ML trainer device comprises assigning the particular ML trainer device to serve the ML training request at the specified training time.

4. The system of claim 1, wherein the scheduler device is configured to:

make a determination that a location of the particular ML trainer device is within a threshold distance of a location of the computational instance, and wherein the scheduler device assigns the ML training request to the particular ML trainer device based at least on the determination.

5. The system of claim 1, wherein the scheduler device is configured to:

make a determination that the particular ML trainer device is available to serve the ML training request, and wherein the scheduler device assigns the ML training request to the particular ML trainer device based at least on the determination.

6. The system of claim 1, wherein the scheduler device is configured to:

determine a performance metric indicating performance of the particular ML trainer device, and wherein the scheduler device assigns the ML training request to the particular ML trainer device based at least on the determined performance metric meeting a criteria.

7. The system of claim 1, wherein the particular ML trainer device is configured to:

transmit to the computational instance, while training the ML model, a message indicating a status of the ML training request.

8. The system of claim 7, wherein the computational instance is configured to:

transmit to a client device of a respectively managed network, while the particular ML trainer device is training the ML model, the message indicating the status of the ML training request.

9. The system of claim 1, wherein the computational instance is configured to:

predict the target variable using the ML model; and transmit, to a client device of a managed network, information indicating a predicted value of the target variable.

10. The system of claim 9, wherein the client device operates a web browser, and wherein transmitting, to the client device, the information indicating the predicted value of the target variable comprises causing the web browser to display the information indicating the predicted value of the target variable.

11. The system of claim 1, wherein the particular ML trainer device comprises a temporary data storage device, wherein the particular ML trainer device is configured to:

store the training data at the temporary data storage device while training the ML model; and delete the training data from the temporary data storage device after completing the training of the ML model.

12. The system of claim 1, wherein the particular ML trainer device is configured to:

receive a randomly generated bitstring associated with the ML training request, wherein the randomly generated bitstring is originally transmitted by the computational instance for reception by a second ML trainer device of the plurality of ML trainer devices;

transmit the randomly generated bitstring to the computational instance along with a request for the training data; and receive the requested training data from the computational instance upon the computational instance verifying that the randomly generated bitstring transmitted by the particular ML trainer device is identical to the randomly generated bitstring originally transmitted by the computational instance.

13. The system of claim 1, wherein the scheduler device is configured to:

receive a second ML training request from a second computational instance; and assign the second ML training request to a second ML trainer device of the plurality of ML trainer devices, wherein the second ML training request identifies: second training data to be used as basis for generating a second ML model, and a second target variable to be predicted using the second ML model, wherein assigning of the second ML training request comprises causing the second ML trainer device of the plurality of ML trainer devices to: receive the second training data from the second computational instance, train the second ML model using the received second training data to predict the second target variable, and provide the second ML model as trained to the second computational instance.

14. The system of claim 1, wherein the scheduler device is configured to:

receive a second ML training request from a second computational instance; and assign the second ML training request to the particular ML trainer device of the plurality of ML trainer devices, wherein the second ML training request identifies: second training data to be used as basis for generating a second ML model, and a second target variable to be predicted using the second ML model, wherein assigning of the second ML training request comprises causing the particular ML trainer device of the plurality of ML trainer devices to: receive the second training data from the second computational instance, train the second ML model using the received second training data to predict the second target variable, and provide the second ML model as trained to the second computational instance.

15. A method comprising:

receiving, by a scheduler device of a remote network management platform, a machine learning (ML) training request from a computational instance, and wherein the remote network management platform comprises a plurality of ML trainer devices, configured to execute a plurality of ML trainer processes;

assigning, by the scheduler device, the ML training request to a particular ML trainer process of the plurality of ML trainer processes and a particular ML trainer device of the plurality of ML trainer devices, wherein the ML training request identifies: training data to be used as basis for generating an ML model, and a target variable to be predicted using the ML model; and providing an identifier of the computational instance to the particular ML trainer device, wherein the identifier enables direct communication between the particular ML trainer device and the computational instance;

wherein assigning of the ML training request comprises causing the particular ML trainer device of the plurality of ML trainer devices to: receive the training data from the computational instance, train the ML model using the particular ML trainer process using the received training data to predict the target variable, and provide the trained ML model to the computational instance for local use on the computational instance.

16. The method of claim 15, wherein, after the particular ML trainer device provides the trained ML model to the computational instance, the computational instance predicts the target variable using the trained ML model and transmits, to a client device of a respectively managed network, information indicating a predicted value for the target variable.

17. The method of claim 16, wherein the client device operates a web browser, and wherein transmitting, to the client device, information indicating the predicted value for the target variable comprises causing the web browser to display the information indicating the predicted value for the target variable.

18. The method of claim 15, comprising:

receiving, by the scheduler device, a second ML training request from a second computational instance; and assigning, by the scheduler device, the second ML training request to a second ML trainer device of the plurality of ML trainer devices, wherein the second ML training request identifies: second training data to be used as basis for generating a second ML model, and a second target variable to be predicted using the second ML model, wherein assigning of the second ML training request comprises causing the second ML trainer device of the plurality of ML trainer devices to: receive the second training data from the second computational instance, train the second ML model using the received second training data to predict the second target variable, and provide the second ML model as trained to the second computational instance.

19. A non-transitory computer-readable medium, having stored thereon program instructions that, upon execution by a scheduler device of a remote network management platform, cause the scheduler device to perform operations comprising:

receiving a machine learning (ML) training request from a computational instance, and wherein the remote network management platform comprises a plurality of ML trainer devices, configured to execute a plurality of ML trainer processes;

assigning the ML training request to a particular ML trainer process of the plurality of ML trainer processes and a particular ML trainer device of the plurality of ML trainer devices, wherein the ML training request identifies: training data to be used as basis for generating an ML model, and a target variable to be predicted using the ML model;

providing an identifier of the computational instance to the particular ML trainer device, wherein the identifier enables direct communication between the particular ML trainer device and the computational instance; and determining a performance metric indicating performance of the particular ML trainer device, wherein assigning of the ML training request comprises causing the particular ML trainer device of the plurality of ML trainer devices to: receive the training data from the computational instance, train the ML model using the particular ML trainer process using the received training data to predict the target variable, and provide the trained ML model to the computational instance for local use on the computational instance.

20. The non-transitory computer-readable medium of claim 19, wherein a client device of a respectively managed network operates a web browser, wherein, after the particular ML trainer device provides the trained ML model to the computational instance, the computational instance predicts the target variable using the trained ML model and causes the web browser to display information indicating a predicted value for the target variable.

* * * * *

UNITED STATES PATENT AND TRADEMARK OFFICE
CERTIFICATE OF CORRECTION

PATENT NO. : 11,620,571 B2
APPLICATION NO. : 16/506827
DATED : April 4, 2023
INVENTOR(S) : Bendre et al.

It is certified that error appears in the above-identified patent and that said Letters Patent is hereby corrected as shown below:

On the Title Page

Page 2, item (60), Line 2, IN THE RELATED U.S. APPLICATION DATA:
Change the provisional application number "62/502,550" to "62/502,440".

Signed and Sealed this
First Day of August, 2023

Katherine Kelly Vidal
*Director of the United States Patent and Trademark Office*